United States Patent
Pruzina (10) Patent No.: US 9,719,827 B2
(45) Date of Patent: Aug. 1, 2017

(54) SYSTEM FOR CALCULATING AND DISPLAYING REMAINING RUNTIME FOR A PORTABLE GENERATOR

(71) Applicant: Generac Power Systems, Inc., Waukesha, WI (US)

(72) Inventor: Steven P. Pruzina, Milwaukee, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 14/963,538

(22) Filed: Dec. 9, 2015

(65) Prior Publication Data

US 2016/0161318 A1  Jun. 9, 2016

Related U.S. Application Data

(60) Provisional application No. 62/089,577, filed on Dec. 9, 2014, provisional application No. 62/089,684, filed on Dec. 9, 2014.

(51) Int. Cl.
| G08C 19/06 | (2006.01) |
| G01F 9/00 | (2006.01) |
| G01F 15/06 | (2006.01) |
| G08C 19/00 | (2006.01) |

(52) U.S. Cl.
CPC ............ *G01F 9/008* (2013.01); *G01F 15/068* (2013.01); *G08C 19/00* (2013.01)

(58) Field of Classification Search
CPC ..... H04J 11/0066; H04L 27/265; H04L 25/08
See application file for complete search history.

(56) References Cited

U.S. PATENT DOCUMENTS

| 6,631,310 | B1 | 10/2003 | Leslie |
| 7,142,950 | B2 | 11/2006 | Rasmussen et al. |
| 7,360,529 | B2 | 4/2008 | Ziegler et al. |
| 7,397,217 | B2 | 7/2008 | Van Brocklin et al. |
| 7,418,314 | B2 | 8/2008 | Rasmussen et al. |
| 7,983,797 | B2 | 7/2011 | Rasmussen et al. |
| 7,992,433 | B2 | 8/2011 | Ziegler et al. |
| 2004/0146769 | A1* | 7/2004 | Birschbach ......... H01M 8/2455 429/410 |
| 2005/0278075 | A1* | 12/2005 | Rasmussen ............... H02J 9/06 700/286 |
| 2006/0072262 | A1* | 4/2006 | Paik ......................... H02J 3/14 361/62 |
| 2006/0090552 | A1* | 5/2006 | Ziegler ................... G01F 9/008 73/114.54 |
| 2006/0129798 | A1 | 6/2006 | Bance et al. |
| 2008/0179967 | A1 | 7/2008 | Lathrop et al. |
| 2008/0262990 | A1* | 10/2008 | Kapoor ................... G06F 9/505 706/20 |

(Continued)

OTHER PUBLICATIONS http://www.northerntool.com/shop/tools/product_200402013_200402013, printed Mar. 10, 2016.

*Primary Examiner* — Erin File
(74) *Attorney, Agent, or Firm* — Boyle Fredrickson, S.C.

(57) ABSTRACT

A system is provided for calculating and displaying an estimated remaining runtime for a portable generator. The system may include fuel sender with capacitive sensors communicating with a control system to display the fuel level and/or remaining runtime that can be recalculated when step changes in system performance are detected.

7 Claims, 11 Drawing Sheets

(56) References Cited

U.S. PATENT DOCUMENTS

| | | |
|---|---|---|
| 2009/0240377 A1 | 9/2009 | Batzler et al. |
| 2011/0090726 A1 | 4/2011 | Brotto et al. |
| 2012/0025620 A1 | 2/2012 | Stump et al. |
| 2012/0119916 A1 | 5/2012 | Burrow |
| 2012/0146417 A1 | 6/2012 | Rasmussen et al. |
| 2012/0265429 A1 | 10/2012 | Perera et al. |
| 2013/0173185 A1 | 7/2013 | Witter et al. |
| 2013/0342020 A1* | 12/2013 | Blevins .................. H02J 4/00 307/84 |
| 2015/0324696 A1* | 11/2015 | Hirschbold ............. H02J 3/12 706/46 |
| 2016/0136747 A1* | 5/2016 | Trinkner ............. F02M 51/005 219/133 |
| 2016/0160753 A1* | 6/2016 | Boutot ................. F02B 63/048 220/23.83 |

\* cited by examiner

1/3 main tank full    Full main and auxiliary tanks    Low fuel

SYSTEM FOR CALCULATING AND DISPLAYING REMAINING RUNTIME FOR A PORTABLE GENERATOR

CROSS-REFERENCE TO RELATED APPLICATIONS

This application claims priority from U.S. Provisional patent application Ser. No. 62/089,577 filed on Dec. 9, 2014 and from U.S. Provisional Patent Application Ser. No. 62/089,684 filed on Dec. 9, 2014, the entirety of which is expressly incorporated by reference herein.

FIELD OF THE INVENTION

The present invention relates generally to portable generators, and in particular, to a system for calculating and displaying remaining runtime for the portable generator.

BACKGROUND AND SUMMARY OF THE INVENTION

Portable generators continue to gain popularity and to be designed to be smaller and lighter to increase their portability. In order to maintain the small and lightweight characteristics, portable generators have onboard or main fuel tanks that are relatively small because carrying onboard fuel can significantly add to the weight of a portable generator. The limited fuel capacity results in a limited runtime of the portable generator. Efforts have been made to provide additional fuel capacity to portable generators by adding stand-alone auxiliary fuel tanks with external fuel lines and ancillary priming bulbs or other devices. Known stand-alone auxiliary fuel tanks require manual manipulation to connect to the fuel system of the portable generator and can be difficult to evaluate fuel level in the stand-alone auxiliary fuel tanks, which can also make accurately planning generator-dependent activities and tank refills difficult. This can be further complicated by some fuel gauges for the onboard or main tanks being susceptible to inaccuracies or failures since some such gauges include paddle-type fuel senders with rheostats that are wetted by fuel that can be compromised if left in reformulated gasoline as fuel for extended periods of time.

It is an object and feature of the present invention to provide a self-connecting auxiliary tank(s) for a portable generator that provides users extended generator runtime without external hoses and manual siphons and that may display a fuel level of the auxiliary tank(s) and/or combined fuel level of the auxiliary tank(s) and a main or onboard tank and/or a remaining runtime for the portable generator.

It is an object and feature of the present invention to provide a system for calculating and displaying an estimated remaining runtime for a portable generator, which may include recalculating the estimated remaining runtime when a tool-less and self-connecting auxiliary tank(s) is connected to the portable generator.

It is an object and feature of the present invention to provide a method that combines load current and fuel gauge or fuel level values to calculate and/or recalculate an estimated remaining runtime value. This may allow users to plan generator-dependent activities and tank refills and may provide a relatively more accurate estimate of remaining runtime than could be obtained from either a fuel gauge alone or a power meter alone.

It is an object and feature of the present invention to provide a self-connecting auxiliary tank(s) for a portable generator that provides users extended generator runtime without external hoses and manual siphons and that may display a fuel level of the auxiliary tank(s) and/or combined fuel level of the auxiliary tank(s) and a main or onboard tank and/or a remaining runtime for the portable generator.

According to one aspect of the invention, a method is provided for calculating and displaying an estimated remaining runtime for a portable generator. The generator has a fuel tank that stores fuel for consumption by an internal combustion engine providing torque that is converted into electrical energy in the generator. An initial runtime estimation is performed by detecting an initial fuel level characteristic of fuel in the fuel tank, such as how much fuel is in the tank. An initial generator load characteristic of load being applied to the generator is detected, such as energy used by an accessory plugged into the generator which may correspond to an energy value such as BTUs (British Thermal Units) used by the generator. An initial estimated remaining runtime value is calculated that corresponds to a time duration at which the generator can continue to operate until running out of fuel based on the detected initial fuel level and generator load characteristics. The initial estimated remaining runtime value is displayed as an indicated remaining runtime for viewing by a user. A revised runtime estimation is performed by evaluating current or updated detected values of the fuel level and generator load characteristics. A revised estimated remaining runtime value is calculated that corresponds to a time duration at which the generator can continue to operate until running out of fuel based on more recent detected current fuel level and generator load characteristics. The revised estimated remaining runtime value is displayed as the indicated remaining runtime. The indicated remaining runtime may be displayed as a numerical value, such as in a countdown time form in hours and/or minutes.

According to another aspect of the invention, a step update may be done by performing a step updated revised runtime estimation. The step updated revised runtime estimation includes identifying a step change in a value of at least one of the fuel level and generator load characteristics. The step change(s) corresponds to a change exceeding a respective threshold value indicating a relatively large change influencing an amount of time at which the generator can continue to operate until running out of fuel. This can include rapid changes in the overall generator system such as filling or siphoning the fuel tank, adding or removing an auxiliary fuel tank(s), and/or adding or removing an electrical load consuming power from the generator. When the step change is detected, the current fuel level and generator load characteristics are detected. A step updated revised estimated remaining runtime value is calculated that corresponds to the time duration at which the generator can continue to operate until running out of fuel with the new load and/or amount of fuel. The step updated revised estimated remaining runtime value is displayed as the indicated remaining runtime.

According to another aspect of the invention, a system calculates and displays an estimated remaining runtime for a portable generator. The system includes a fuel sender extending at least partially into a fuel tank of the generator. The fuel sender has a sensor arrangement configured to provide a signal corresponding to a portion of the sensor arrangement that is submerged in fuel stored in the fuel tank. A control system is operably connected to the fuel sender and configured to receive the signal from the sensor arrangement and to evaluate the signal to determine a fuel level of the fuel stored in the fuel tank. A display system is operably connected to the control system and configured to display the fuel level for viewing by a user.

According to another aspect of the invention, the sensor arrangement may have multiple capacitive sensing elements vertically stacked so that the fuel stored in the fuel tank wets respective portions of the multiple capacitive sensing elements. Wetting of the portions of the capacitive sensing elements changes capacitive characteristics so that portions submerged in fuel have different capacitance values than portions above the fuel level and thus not wetted.

According to another aspect of the invention, the fuel sender has a printed circuit board (PCB) upon which the multiple capacitive sensing elements are arranged. A cover may overlie the PCB to provide a barrier between the PCB and the fuel stored in the fuel tank. The cover can be incorporated as an encapsulating material such as conformal coat, an over mold, and/or a molded plastic housing, overlying the PCB. According to another aspect of the invention, the control system includes a microcontroller mounted to the PCB and operably connected to the multiple capacitive sensing elements.

According to another aspect of the invention, a system is provided that detects whether an auxiliary fuel tank(s) is connected to a portable generator. An onboard or main fuel tank of the portable generator and the auxiliary fuel tank(s) may each include separate fuel level sensor(s), and a control system may receive signals from each fuel level sensor. The control system may calculate the amount of fuel remaining and/or the remaining runtime based on both signals and may further evaluate generator load when determining the remaining runtime. When the auxiliary tank is connected or disconnected, the control system automatically updates information displayed such as on a generator control panel, which may provide a visual indication of both the amount of fuel remaining and the duration of the estimated remaining runtime.

According to another aspect of the invention, communication between an auxiliary fuel tank(s) and the portable generator can be established through an electrical connector arrangement that facilitates tool-less self-connection of the auxiliary tank(s) to the portable generator. The electrical connector arrangement may include a female contact portion that is recessed into and defines a pocket within a bottom wall of a housing of the generator. The female contact portion may include spring contacts extending transversely across the pocket of the female contact portion. A male contact portion may be arranged at the auxiliary fuel tank(s) and extend upwardly from a top wall of the auxiliary fuel tank(s). The male contact portion may define a generally wedge-shaped or triangular profile when viewed from a side elevation with a pair of converging angled walls to which the contacts of the male contact portion are mounted. When the female and male contact portions engage each other, the spring contacts of the female contact portion create a wiping motion along the angled walls of the male contact portion to remove debris as it is inserted into the female contact portion of the electrical connector arrangement. The spring contacts of the female contact portion also bias against the contacts of the male contact portion to establish and maintain a good electrical connection.

Other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate the best mode presently contemplated of carrying out the invention.

In the drawings.

DETAILED DESCRIPTION OF THE DRAWINGS

Figure 1:
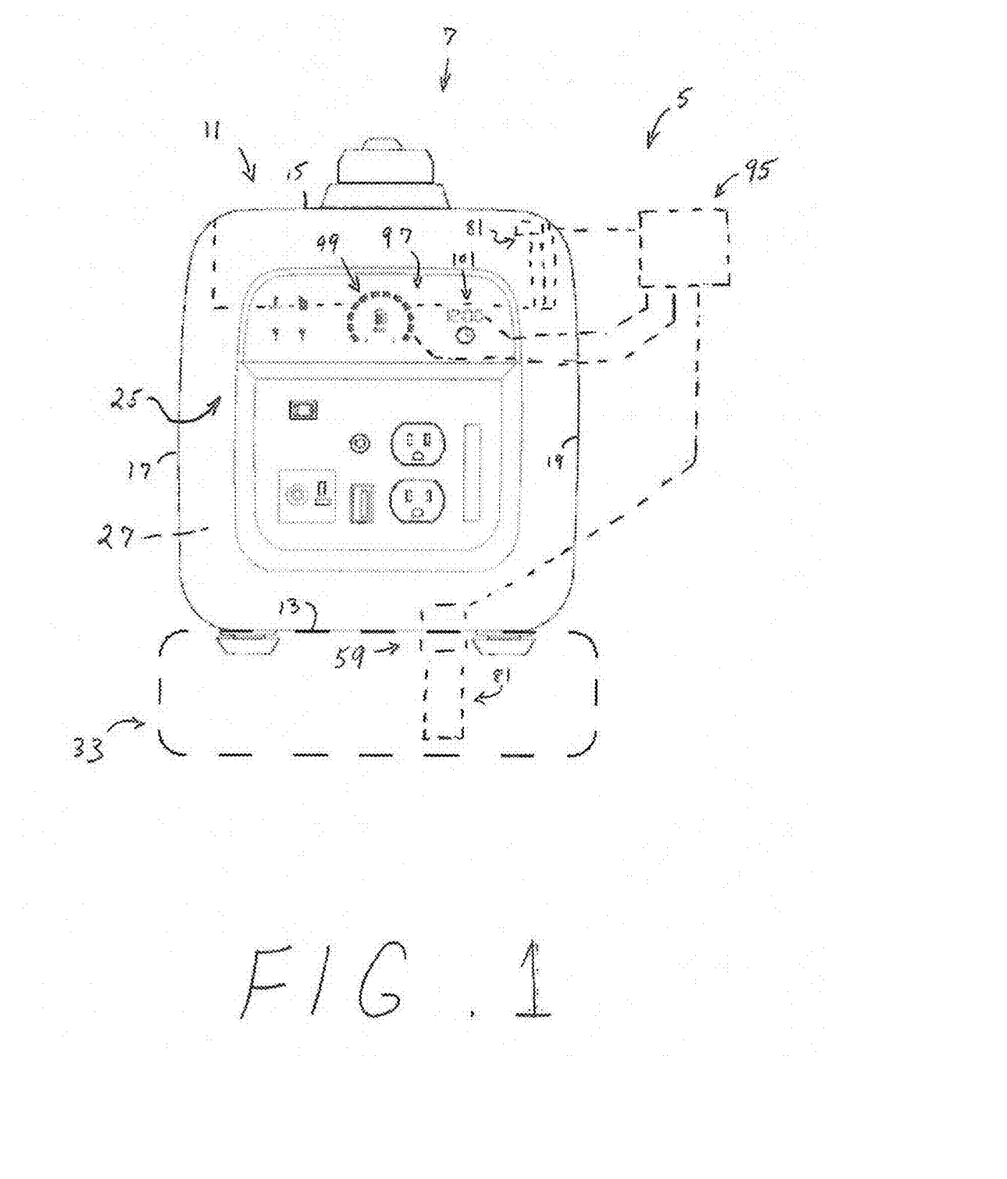
FIG. 1 is a front elevation of a simplified and partially schematic representation of a system for calculating and displaying remaining runtime for a portable generator in accordance with the present invention.
Figure 2:
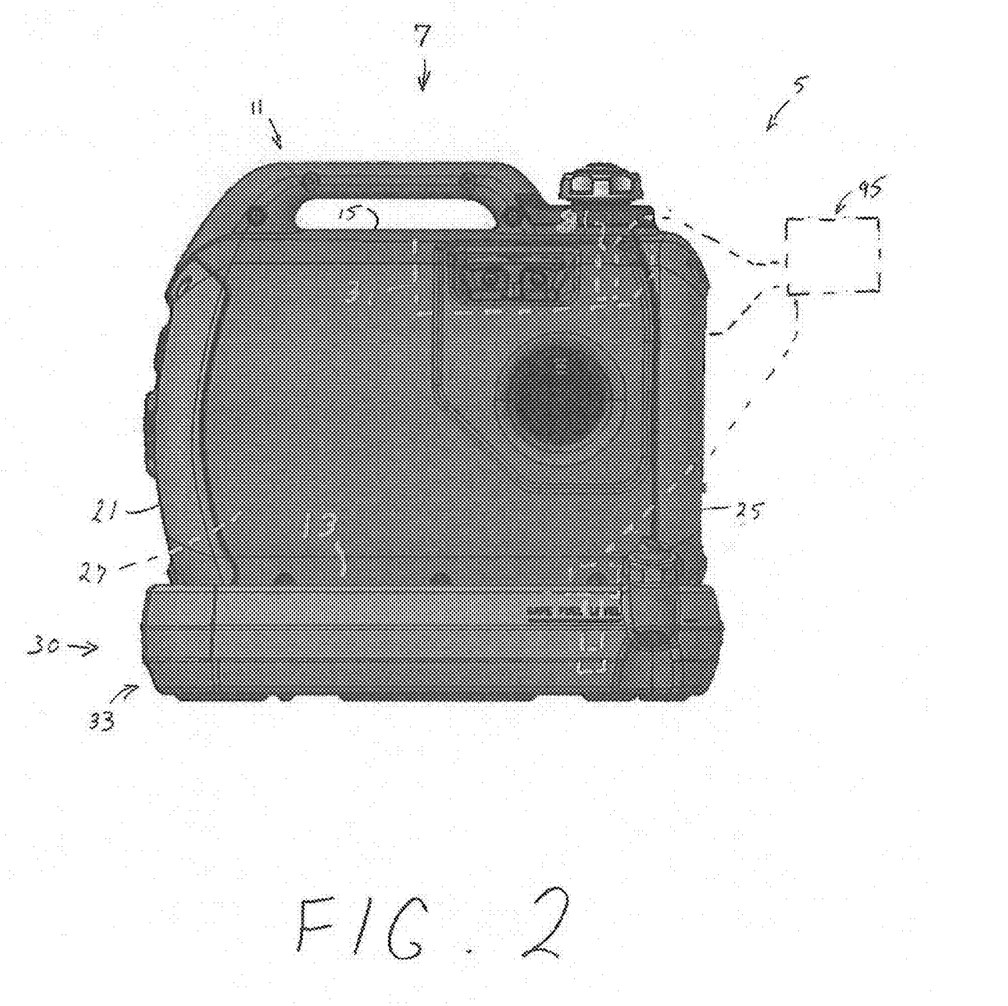
FIG. 2 is a side elevation view of a portion of the system of FIG. 1.

Referring now to the drawings and specifically to FIG. 1, system 5 for calculating remaining runtime for a portable generator 7 is shown that is configured to calculate and display at least one of a fuel level and an estimated duration until all fuel will be consumed and the generator 7 will turn off, as explained in greater detail elsewhere herein. Generator 7 is shown as an enclosed generator with housing 11 that has interconnected panels or walls, including bottom and top walls 13, 15 and side walls 17, 19 extending between and connecting the top and bottom walls 13, 15. Referring now to FIGS. 1 and 2, back and front walls 21, 25 (FIG. 2) are arranged at opposite ends of the housing 11. The interconnected bottom, top, side, front, and back walls 13, 15, 17, 19, 21 and 25 collectively define an enclosure of housing 11 that surrounds an open interior space 27. Mounted within the space 28 is an arrangement for generating electricity. The generator 7 may be an inverter generator with an internal combustion engine that drives an alternator that produces multiphase AC (alternating current) power that is converted to DC (direct current) power and an inverter module assembly that converts the DC power into single phase AC power that replicates line power, such as 120V 60 Hz or other suitable voltages and frequencies of AC power, for powering various electrically powered products, putting a load on the generator when the products are energized.

Figure 3:
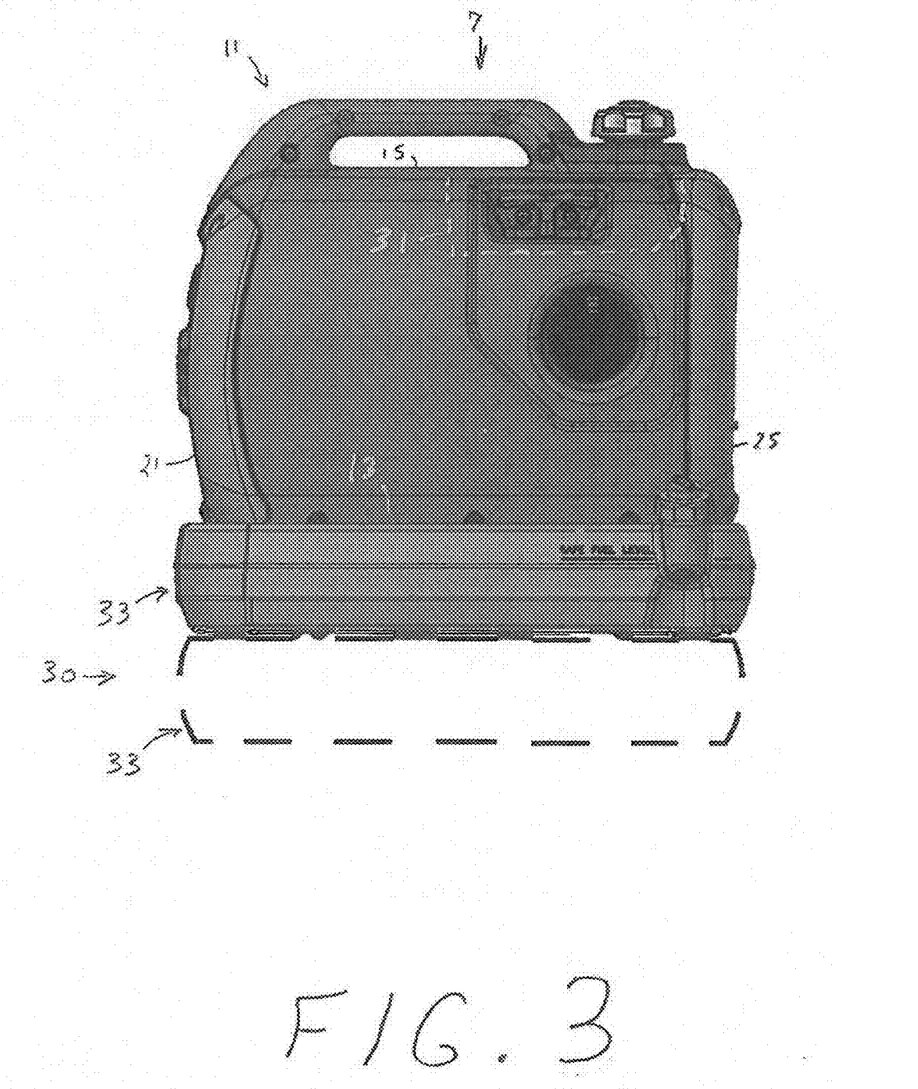
FIG. 3 is a side elevation view of a variant of the system of FIG. 2.
Figure 4:
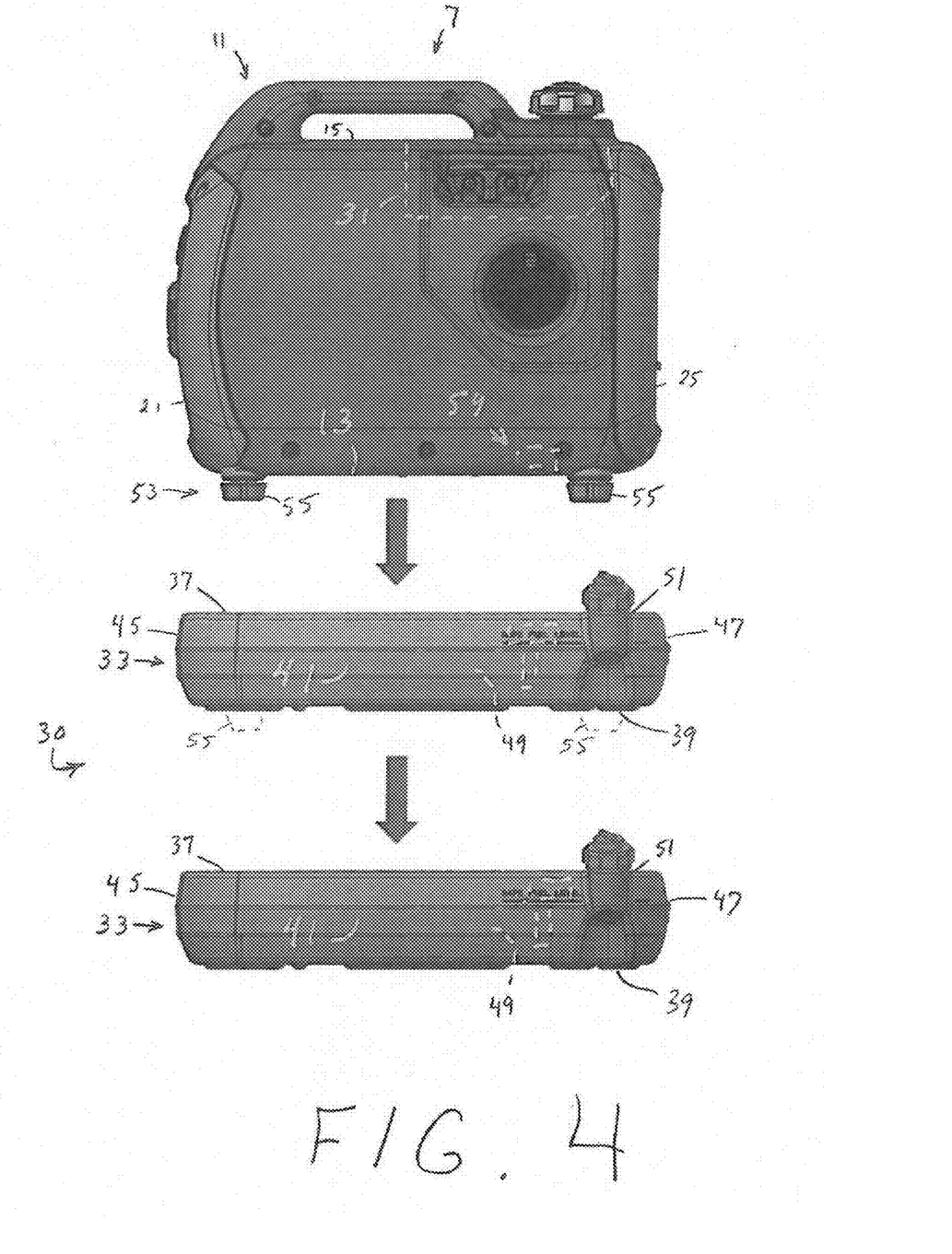
FIG. 4 is an exploded side elevation of the system of FIG. 2.

Still referring to FIGS. 1 and 2, fuel storage system 30 includes fuel tank 31 that is mounted within interior space 27 as an onboard or main fuel tank 31 for storing fuel such as gasoline inside the generator 7, itself. One or more auxiliary fuel tanks 33 of fuel storage system 30 can be attached to the generator 7 for providing more stored fuel on generator 7 to operate for an extended runtime. Each auxiliary fuel tank(s) 33 is configured to tool-lessly self-connect to the generator 7 or another auxiliary fuel tank(s) 33, such as by way of alignment and press-fit docking of generator 7 to auxiliary fuel tank(s) 33, or auxiliary tank(s) 33 to each other, without external hoses or manual siphons and without requiring direct manual manipulation of connecting hardware, as explained in greater detail elsewhere herein. Referring now to FIGS. 2-4, FIG. 2 shows generator 7 docked or connected to an auxiliary fuel tank 33, which increases the capacity of the fuel storage system 30. FIG. 3 shows generator 7 docked or connected to a first auxiliary fuel tank 33 with a second auxiliary fuel tank 33 shown in phantom outline form stored below the first auxiliary fuel tank 33 vertically stacked and nested into the second auxiliary fuel tank 33. FIG. 4 shows an implementation of connecting generator 7 to a first auxiliary fuel tank 33 while stacking the first auxiliary fuel tank 33 onto the second, lower, auxiliary fuel tank 33 for storage. It is understood that multiple auxiliary fuel tank 33 can be simultaneously operably connected to the generator 7 by duplication of the various alignment and connection arrangements, described in greater detail elsewhere herein, between the generator and auxiliary fuel tank 33 to be provided between multiple engaged auxiliary fuel tanks 33.

Figure 5:
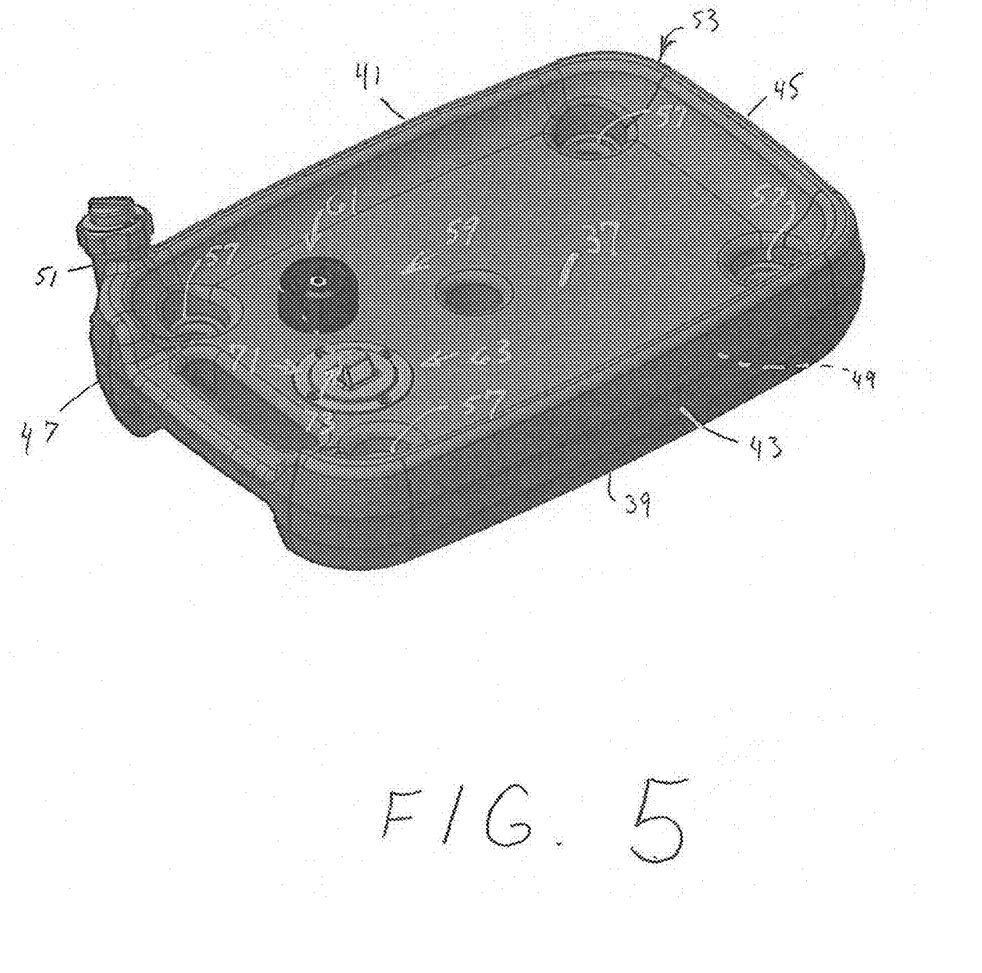
FIG. 5 is an isometric view of a portion of an auxiliary tank of the system of FIG. 1.

Referring now to FIGS. 4 and 5, each auxiliary fuel tank 33 defines an enclosure shown as tank body 35 with top and bottom walls 37, 39, side walls 41, 43, and back and front walls 45, 47 collectively extend about a tank interior space 49 in which the fuel is stored. Fill neck 51 extends from the tank body 35 and is configured to allow fuel to be poured into the tank interior space 49. Alignment system 53 facilitates connecting the generator 7 to auxiliary fuel tank(s) 33, or auxiliary tank(s) 33 to each other with cooperating guiding and aligning components such as posting receptacles. Such aligning components include feet 55 extending from a lower surface of bottom wall 13 that are tapered and are received in correspondingly tapered pockets or cavities 57 extending into an upper surface of auxiliary tank top wall 37. Feet 55 may also be provided extending from a lower surface auxiliary tank bottom wall 39, or alignment between nested and vertically stacked auxiliary fuel tanks 33 can be provided by receipt of the tapering lower portions of the interconnected side, back, and front walls 41, 43, 45, 47 into correspondingly tapering depression defined by a concave transition from upper edges of interconnected side, back, and front walls 41, 43, 45, 47 into the top wall 37. Regardless of the particular components of alignment system 53, the respective components of alignment system 53 are configured to engage each other and compel alignment of the generator 7 and/or auxiliary fuel tank(s) 33 with respect to each other before engagement of components of connection system 59.

Figure 6:
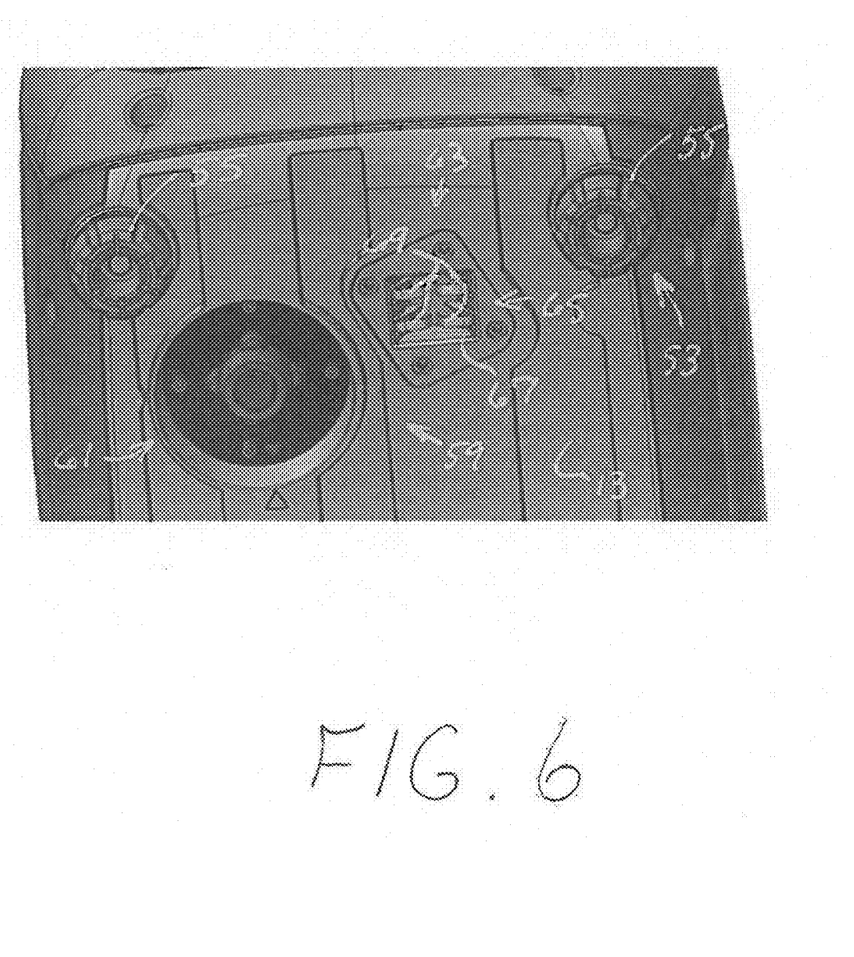
FIG. 6 is an isometric view of a portion of a bottom wall of the generator of FIG. 1
Figure 7:
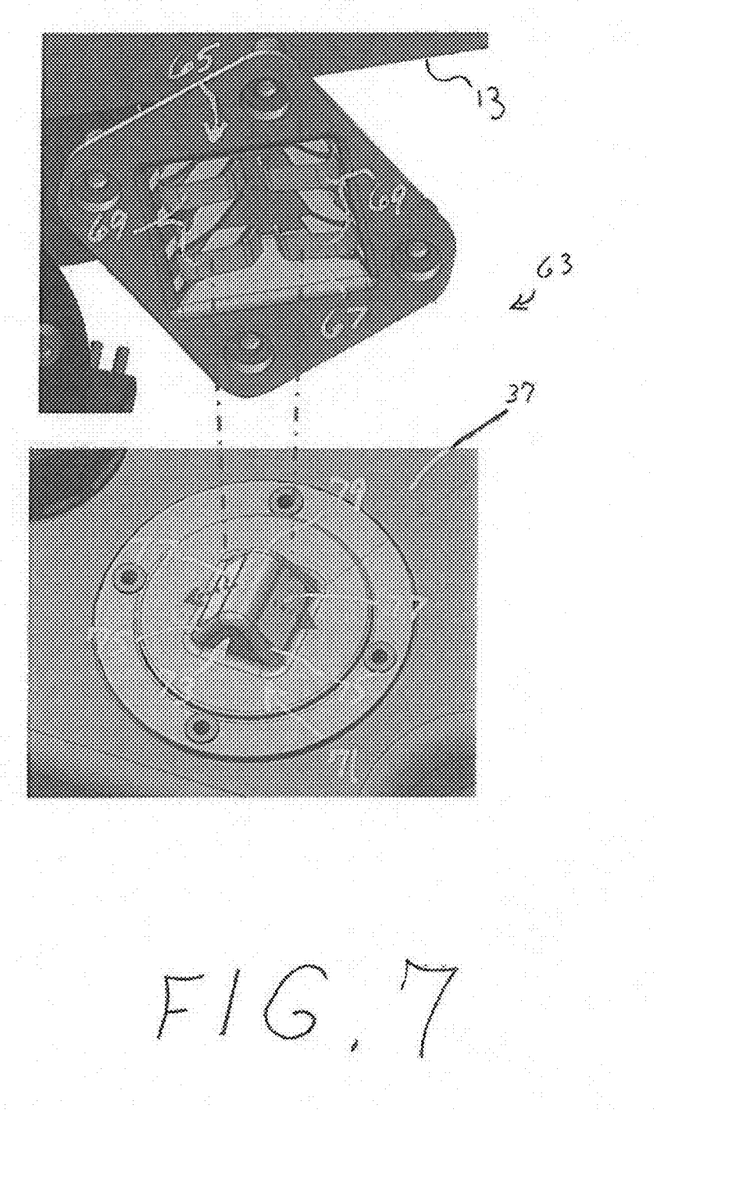
FIG. 7 is an exploded isometric view of an electrical connector arrangement of FIG. 1.

Referring now to FIGS. 5 and 6, connection system 59 includes self-connecting arrangements for connecting fuel and electrical system of the generator 7 and/or auxiliary fuel tank(s) 33, shown in fuel-fitting arrangement 61 and electrical connector arrangement 63. Fuel-fitting arrangement 61 includes male and female fittings that are configured to self-connect and seal, providing a siphon connection between the auxiliary fuel tank(s) 33 and the main fuel tank 31 (FIG. 4) when the generator 7 is pressed downwardly onto the auxiliary fuel tank(s) 33 and/or when an auxiliary fuel tank 33 is pressed downwardly onto another auxiliary fuel tank(s) 33. Referring now to FIG. 7, electrical connector arrangement 63 includes female contact portion 65 that is recessed into and defines pocket 67 within the housing bottom wall 13. Female contact portion 65 has spring contacts 69 extending transversely across pocket 67, presenting flexible fingers extending toward each other across an outer opening of pocket 67. Male contact portion 71 is arranged at the auxiliary fuel tank(s) 33, extending upwardly from an upper surface of auxiliary tank top wall 37. Male contact portion 71 includes body 73 with a generally wedge-shaped or triangular profile when viewed from a side elevation. Body 73 of male contact portion 71 has a pair of converging angled walls 75 upon which contacts 77 of the male contact portion 71 are arranged on opposite sides of ridge 79 that is defined at a line of intersection between the walls 75. When the female and male contact portions 65, 71 engage each other, the spring contacts 69 of the female contact portion 65 create a wiping motion along the angled walls 75 of the male contact portion 71 to remove debris as the male contact portion 71 is inserted into the female contact portion 65 of the electrical connector arrangement 63. The spring contacts 69 of the female contact portion 65 also bias against the contacts 77 of the male contact portion 71 to establish and maintain a good electrical connection through the electrical connector arrangement 63.

Figure 8:
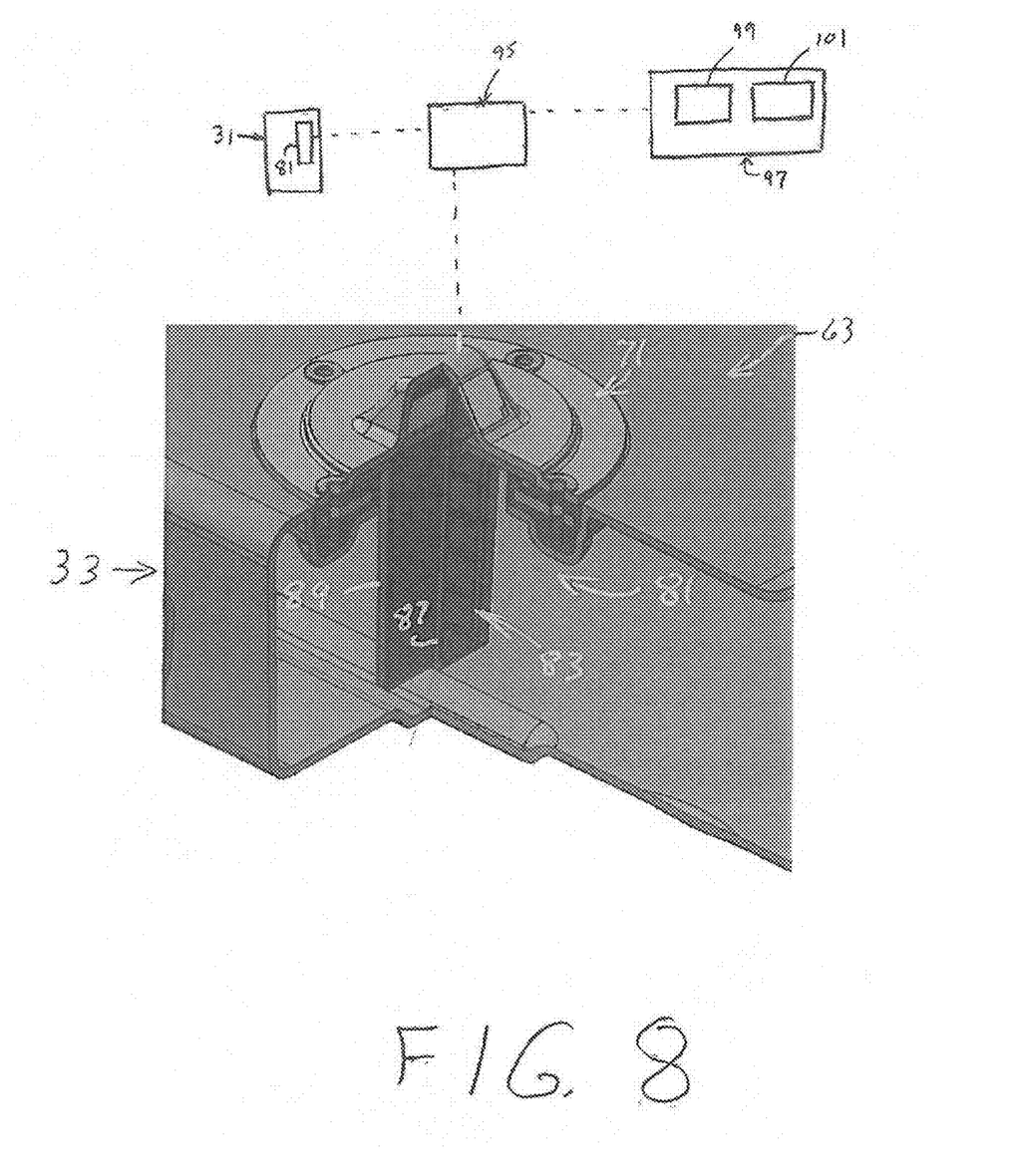
FIG. 8 is an isometric partially cutaway and schematic representation of various components of the system of FIG. 1.

Referring now to FIG. 8, through the electrical connection at the electrical connector arrangement 63, system 5 receives signals relating to fuel characteristics such as fuel level and/or fuel type characteristics from fuel sender 81 operably connected to the male contact portion 71 in auxiliary fuel tank(s) 33 and with signals from fuel sender 81 in main fuel tank(s) 31 (FIG. 1) for calculating and displaying fuel level and/or remaining runtime. Fuel sender 81 has sensor arrangement 83 configured to provide the signal, corresponding to a portion of the sensor arrangement 83 that is submerged in fuel stored in the fuel tank 31, 33.

Figure 9:
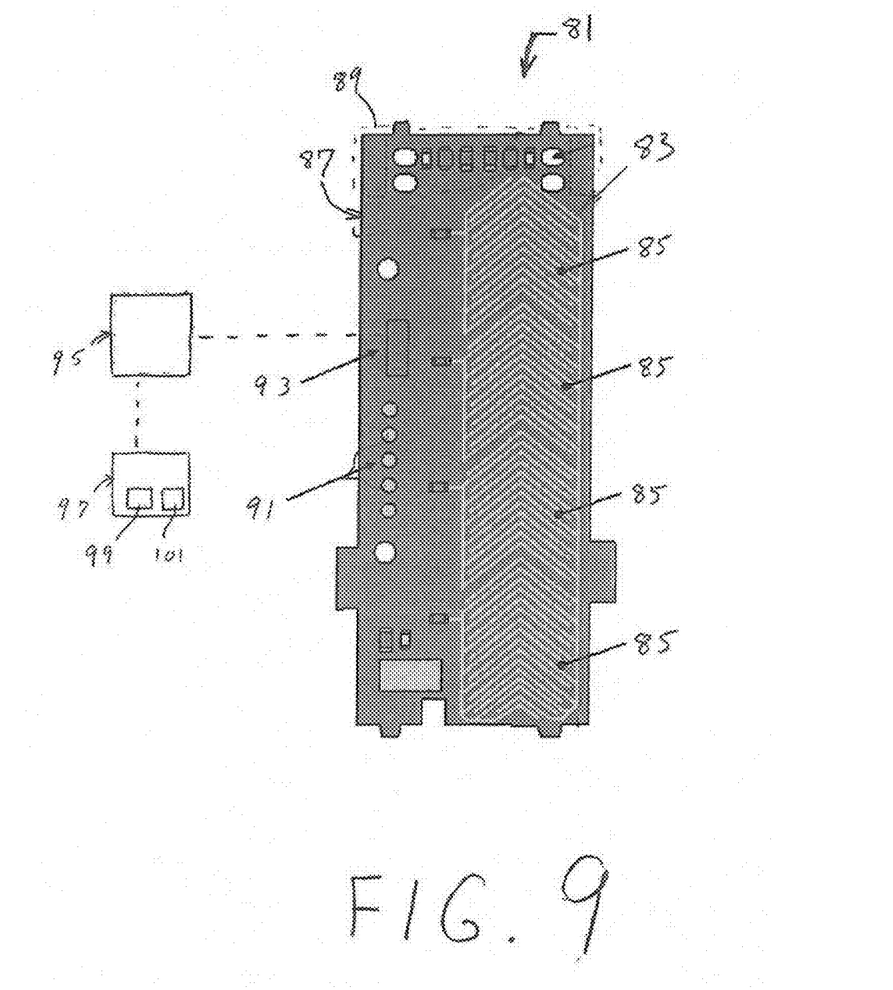
FIG. 9 is a top plan view of a fuel sender of the system of FIG. 1.

Referring now to FIG. 9, the sensor arrangement 83 may have multiple capacitive sensing elements 85 vertically stacked so that the fuel stored in the fuel tank wets respective portions of the multiple capacitive sensing elements 85. Wetting of the portions of the capacitive sensing elements 85 changes capacitive characteristics so that portions submerged in fuel have different capacitance values than portions above the fuel level and thus not wetted. The sensor arrangement 83 is provided on a printed circuit board (PCB) 87 upon which the multiple capacitive sensing elements 85 are operably arranged, for example, as copper features on the PCB 87. A cover 89 is shown in phantom outline, mostly cutaway to better show the various components and portions of the fuel sender 81. The cover 89 may overlie the PCB 87 to provide a barrier between the PCB 87 and the fuel stored in the fuel tank 31, 33. The cover 89 can be incorporated as a material encapsulating the PCB 87 (FIG. 9) such as conformal coat, an over mold, and/or a molded plastic housing (FIG. 8). Fuel sender 81 further includes programming or test pads 91 as an interface for permitting testing and/or programming of fuel sender 81 operably connected to a microcontroller 93 of a control system 95 and a two-wire connection to receive 12V power from a Host such as the control system 95 or a component thereof for powering the microcontroller 93. Control system 95 can includes a controller that includes an industrial computer, microcontroller, microprocessor, or, e.g., a programmable logic controller (PLC), along with corresponding software and suitable memory for storing such software and hardware for controlling various electronic circuits or components of the generator 7, including communicating with microcontroller 93 of fuel sender 81. Control system 95 and/or microcontroller 93 can operably access a database stored in a memory device, which may include additional configuration parameters for controlling the functions of the control system 95 and other components of the generator 7, including a display system 97 at a generator display panel operably connected to and controlled by control system 95 to convey various information to a user in a visually conspicuous manner. It is understood that the control system 95 may be defined by the microcontroller 93 connected by way of a single 2-wire bus from a generator display panel.

Figure 10:
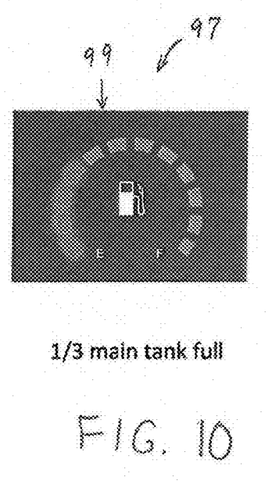
FIG. 10 is a close-up view of a fuel gauge of the system of FIG. 1.
Figure 11:
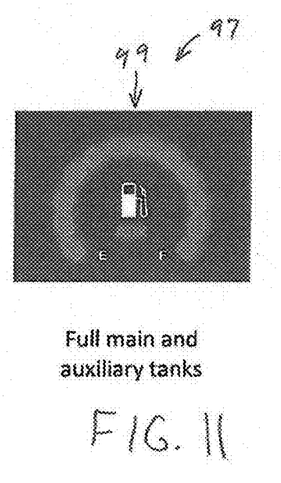
FIG. 11 is another close-up view of the fuel gauge of the system of FIG. 1.
Figure 12:
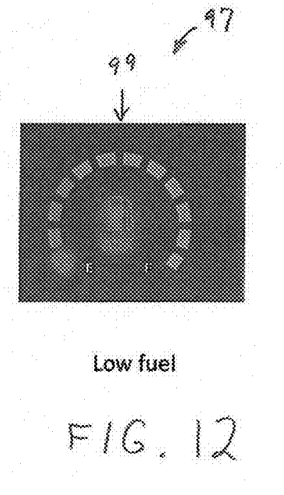
FIG. 12 is another close-up view of the fuel gauge of the system of FIG. 1.

Referring again to FIG. 1, display system 97 includes fuel gauge 99 and remaining runtime display 101 configured to show how much fuel and other statuses of the fuel storage system 30 and an estimated duration before the generator 7 will run out of fuel, respectively. Referring now to FIGS. 10-12, various status indicators of the fuel storage system 30 are shown by way of fuel gauge 99. FIG. 10 shows the generator 7 operating without an auxiliary fuel tank 33 and with the main fuel tank 31 (FIG. 1) at a one-third full level. FIG. 11 shows the generator 7 operating with an auxiliary fuel tank 33 and with the main fuel tank and auxiliary tanks 31, 33 (FIG. 1) at a full level. FIG. 12 shows the generator 7 operating with an auxiliary fuel tank 33 and with both the main fuel tank and auxiliary tanks 31, 33 (FIG. 1) at a low fuel level. Referring now to FIGS. 1 and 10-10, presence or absence of the auxiliary tank(s) 33 is automatically detected by control system 95 and displayed on display system 97. Each fuel sender 81 transmits an identifier signal to the control system 95 that is unique to the particular fuel sender 81 and fuel tank 31, 33. Schedules for data transmission from each fuel sender 81 are different enough such that collisions on the bus are rare. The control system 95 is configured to ignore occasional data gaps resulting from such collisions. Control system 95 infers that an auxiliary fuel tank 33 is not present if it receives no data tagged with that fuel tank 33. This allows the control system 95 automatically detect presence of an auxiliary fuel tank 33, display fuel level and/or estimated remaining runtime, the estimated remaining runtime based on changing conditions or operating parameters of the generator 7.

Figure 13:
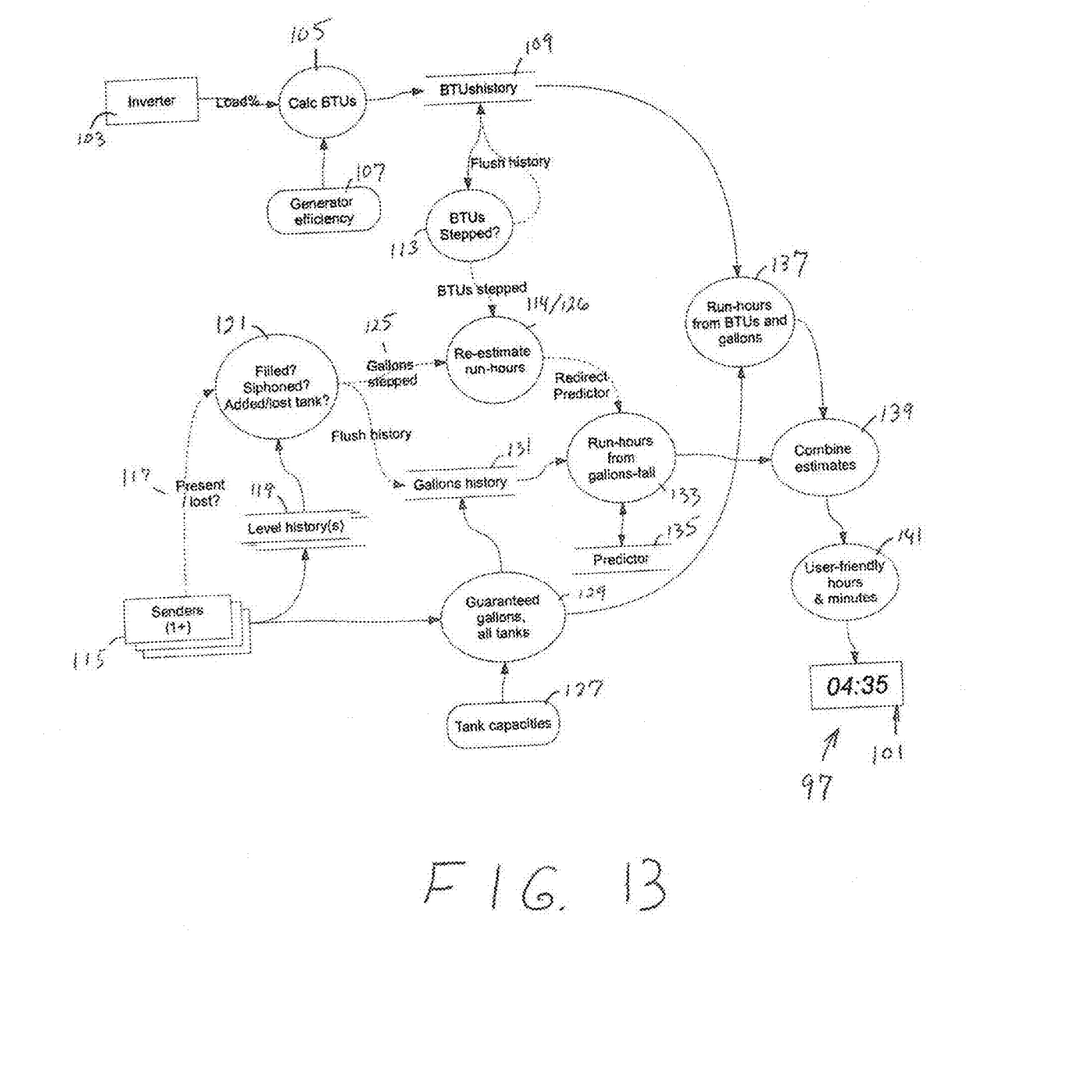
FIG. 13 is a schematic representation of a flow diagram of a method of using the system of FIG. 1.

Referring now to FIG. 14 and with further reference to FIG. 1, the control system 95 can calculate and recalculate remaining runtime based on values of an AC load and fuel gauge readings, such as data from the fuel sender(s) 81. This may be done by the control system 95 calculating total gallons of fuel available in the fuel storage system 30 by evaluating the fuel levels or gallons reported by each fuel sender 81 and also evaluating load percentage of an inverter 103 of the inverter module assembly by way of energy used by the generator, which can be represented as BTUs (British Thermal Units). Toward the top-left of FIG. 13, as represented at blocks 105 and 107, control system 95 can determine generator efficiency by calculating BTUs as a function of evaluating load percentage of the inverter 103. In view of a BTUs history 109 and flush history 111 values, control system 95 can determined whether BTUs are stepped at block 113. The BTUs being stepped indicates a step change(s) corresponding to a change exceeding a respective threshold value indicating a relatively large change influencing an amount of time at which the generator can continue to operate until running out of fuel. Thus, when BTUs are stepped, the change is large enough to warrant an abrupt revision of run-hours at block 114 as an estimated remaining run time, as opposed to changing run-hours gradually based on slower trends on the amount of fuel or BTUs used by the generator 7. Also thus, when BTUs are stepped, the change is large enough to warrant an abrupt revision of the gallons-fall Predictor 135 based on the amount by which BTUs have changed. At the same time, toward the bottom-left of FIG. 13, as indicated by block 115, the fuel senders 81 (FIG. 1) provide signals to the control system 95 corresponding to fuel level in the fuel tanks 31, 33. In view of a presence/lost status 117 and level history 119, control system 95 determines whether fuel tanks 31, 33 are filled, have been have been filled, added, or lost, as represented at block 121. In view of level history 119, the fill, siphoned, added, or lost status 121, control system 95 can determined whether gallons are stepped, as represented by 125. Like the BTUs stepped, the gallons being stepped indicates a step change(s) corresponding to a change exceeding a respective threshold value indicating a relatively large change influencing an amount of time at which the generator can continue to operate until running out of fuel. Thus, when gallons are stepped, the change is large enough to warrant an abrupt revision of run-hours at block 126 as an estimated remaining run time, as opposed to changing run-hours gradually based on slower trends on the amount of fuel or BTUs used by the generator 7. Toward the bottom-middle of FIG. 13, in view of values of known tank capacities 127 of the tanks 31, 33, guaranteed gallons of all tanks as represented at block 129 gallons history 131 can be used for determining run-hours from a gallons-fall value 133 by predictor 135. Toward the right of FIG. 13, run-hours from BTUs and gallons 137 is determined based on the BTUs history 109 and guaranteed gallons of all tanks 129. As represented at block 139, the run hours from the gallons-fall value 133 and run-hours from BTUs and gallons 137 are combined to determine an estimated remaining runtime value, the combination being in a proportion such as to minimize the typical error in this estimated remaining runtime, which is converted into a counting down user-friendly hours and minutes format as represented at block 141 that is displayed in a visually conspicuous way for viewing by a user on the remaining runtime display 101 of the display system 97.

Many changes and modifications could be made to the invention without departing from the spirit thereof. The scope of these changes will become apparent from the appended claims.

I claim:

1. A method for calculating and displaying an estimated remaining runtime for a portable generator with a fuel tank assembly storing fuel for consumption by an internal combustion engine of the portable generator while generating electrical power, the method comprising the steps of:

performing an initial runtime estimation, including,
detecting an initial fuel level characteristic of fuel in the fuel tank assembly;
detecting an initial generator load characteristic of load being applied to the generator;
calculating an initial estimated remaining runtime value corresponding to a time duration at which the generator can continue to operate until running out of fuel based on the detected initial fuel level and generator load characteristics;
displaying the initial estimated remaining runtime value as an indicated remaining runtime for viewing by a user; and performing a revised runtime estimation, including,
detecting a current fuel level characteristic of fuel in the fuel tank assembly after the initial detection of the fuel level characteristic;

detecting a current generator load characteristic of load being applied to the generator after the initial detection of the generator load characteristic;

calculating a revised estimated remaining runtime value corresponding to a time duration at which the generator can continue to operate until running out of fuel based on the detected current fuel level and generator load characteristics; and displaying the revised estimated remaining runtime value as the indicated remaining runtime; and performing a step updated revised runtime estimation, including, identifying a step change in a value of at least one of the fuel level and generator load characteristics, wherein the step change of the value corresponds to a change exceeding a respective threshold value indicating a change influencing an amount of time at which the generator can continue to operate until running out of fuel;

detecting current fuel level characteristic of fuel in the fuel tank assembly after identifying the step change in value of at least one of the fuel level and generator load characteristics;

detecting the current generator load characteristic of load being applied to the generator after identifying the step change in value of at least one of the fuel level and generator load characteristics;

calculating a step updated revised estimated remaining runtime value corresponding to the time duration at which the generator can continue to operate until running out of fuel based on the detected current fuel level and generator load characteristics; and displaying the step updated revised estimated remaining runtime value as the indicated remaining runtime.

2. The method of claim 1 wherein the indicated remaining runtime is displayed as a numerical value.

3. The method of claim 2 wherein the remaining runtime is displayed as at least one of an hours and minutes value.

4. The method of claim 1 wherein the fuel tank assembly includes a main fuel tank and at least one auxiliary fuel tanks operatively connectable to the main fuel tank.

5. The method of claim 1 wherein the fuel tank assembly includes a main fuel tank and at least one auxiliary fuel tank operatively connectable to the main fuel tank and wherein the step of performing the updated revised runtime estimation includes the additional steps of:

identifying the connection or the removal of the auxiliary tank from the main fuel tank and determining a step change of a total amount of fuel available in the fuel assembly, wherein the step change of the total amount of fuel available in the fuel assembly corresponds to a change of the total amount of fuel available which exceeds a threshold value;

calculating a revised estimated remaining runtime value corresponding to a time duration at which the generator can continue to operate until running out of fuel based on the total amount of fuel available and the generator load characteristics; and displaying the revised estimated remaining runtime value as the indicated remaining runtime.

6. A method for calculating and displaying an estimated remaining runtime for a portable generator with a fuel tank assembly storing fuel for consumption by an internal combustion engine of the portable generator while generating electrical power, the method comprising the steps of:

operatively connecting at least one auxiliary fuel tank to a main fuel tank of the fuel tank assembly; and performing an initial runtime estimation, including, detecting an initial fuel level characteristic of fuel in the fuel tank assembly;

detecting an initial generator load characteristic of load being applied to the generator;

calculating an initial estimated remaining runtime value corresponding to a time duration at which the generator can continue to operate until running out of fuel based on the detected initial fuel level and generator load characteristics;

displaying the initial estimated remaining runtime value as an indicated remaining runtime for viewing by a user; and performing a revised runtime estimation, including, detecting a current fuel level characteristic of fuel in the fuel tank assembly after the initial detection of the fuel level characteristic;

detecting a current generator load characteristic of load being applied to the generator after the initial detection of the generator load characteristic;

calculating a revised estimated remaining runtime value corresponding to a time duration at which the generator can continue to operate until running out of fuel based on the detected current fuel level and generator load characteristics; and displaying the revised estimated remaining runtime value as the indicated remaining runtime.

7. The method of claim 6 wherein the step of detecting an initial fuel level characteristic of fuel in the fuel tank assembly includes the steps:

detecting the presence of the auxiliary fuel tank operatively connected to the main fuel tank; and if the auxiliary fuel tank is detected, performing the step of detecting an initial fuel level characteristic of fuel in the main fuel tank and of fuel in the auxiliary fuel tank.

* * * * *